United States Patent
Kawamura

[11] 4,025,170
[45] May 24, 1977

[54] RETRO-FOCUS TYPE WIDE ANGLE OBJECTIVE LENS

[75] Inventor: Naoto Kawamura, Inagi, Japan

[73] Assignee: Canon Kabushiki Kaisha, Tokyo, Japan

[22] Filed: Oct. 10, 1975

[21] Appl. No.: 621,595

[30] Foreign Application Priority Data

Oct. 21, 1974   Japan ............................. 49-121141

[52] U.S. Cl. .................................................. 350/214
[51] Int. Cl.² ...................................... G02B 13/04
[58] Field of Search ........... 350/214, 215, 216, 220

[56] References Cited
UNITED STATES PATENTS

| | | | |
|---|---|---|---|
| 3,748,021 | 7/1973 | Tajima et al. | 350/214 |
| 3,923,369 | 12/1975 | Nakamura | 350/214 |

*Primary Examiner*—John K. Corbin
*Assistant Examiner*—Conrad Clark
*Attorney, Agent, or Firm*—Toren, McGeady and Stanger

[57] ABSTRACT

A retrofocus type wide angle objective lens comprising a negative lens group N and a positive lens group P having a diaphragm therein arranged in this order from the object side, said negative lens group N being constructed from a divergent front lens group F and a rear lens group R. When the lens is focused to a close object, only the rear lens group R located in the divergent light bundle from said front lens group F is moved in a different manner from that in which the other lens groups are moved in unison to effect good correction of aberrations in close photography.

12 Claims, 30 Drawing Figures

SPHERICAL ABERRATION

ASTIGMATISM

LATERAL ABERRATION (W=37°)

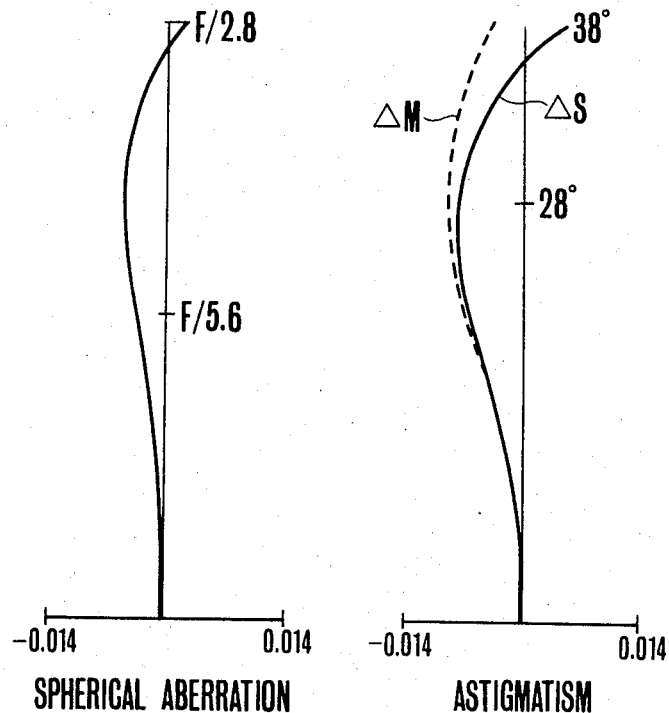

SPHERICAL ABERRATION

ASTIGMATISM

LATERAL ABERRATION ( W=38° )

FIG.8A
FIG.8B
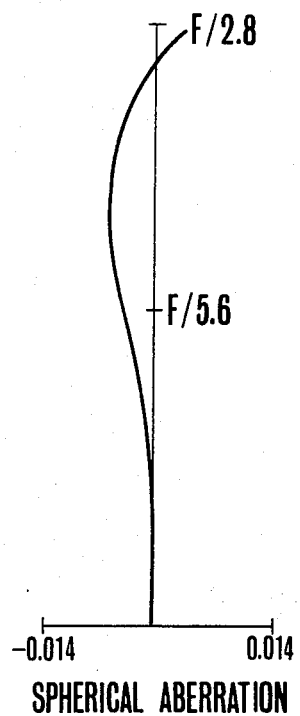
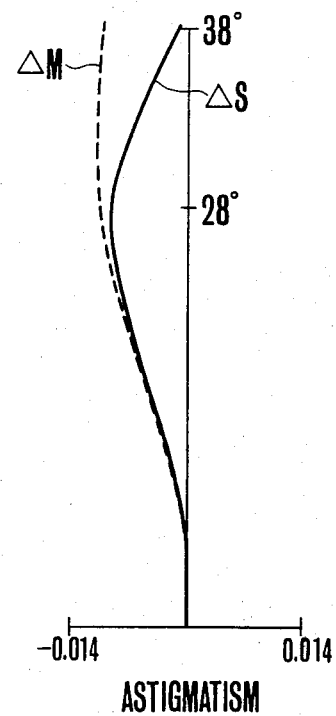
SPHERICAL ABERRATION
ASTIGMATISM
FIG.8c
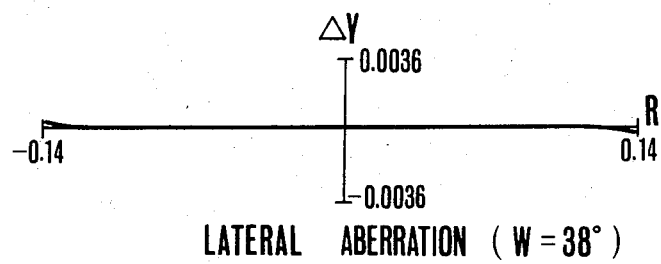
LATERAL ABERRATION (W = 38°)

SPHERICAL ABERRATION  ASTIGMATISM

LATERAL ABERRATION (W=38°)

RETRO-FOCUS TYPE WIDE ANGLE OBJECTIVE LENS

BACKGROUND OF THE INVENTION

1. Field of the Invention

This invention relates to a retrofocus type wide angle objective lens in which aberrations are prevented from deteriorating even in short distance photography.

2. Description of the Prior Art

In general, the aberrational state of an optical lens varies with object distance. Ordinary photographic lenses are corrected for aberrations at infinity so that the closer the object position is with the photographing lens, the larger the aberrations become with the result that the picture quality on the film deteriorates.

This phenomenon is especially remarkable in optical systems of longitudinal asymmetry with respect to the diaphragm thereof and it has been a very serious problem in retrofocus type lenses as the field angle is large.

In general, the retrofocus type lens when focused to a cloe object produces spherical aberration, coma, astigmatism and curvature of field to a remarkable extent. Therefore, various techniques of correcting aberrations at short distances have been proposed.

However, most of these proposals are subjected to a limitation such that air spaces in which axial rays are parallel or substantially parallel with the optical axis be varied. This limitation is laid down for the purpose of producing to bad influence on the spherical aberration and back focus.

Although this method is effective for correction of astigmatism and curvature of field, generally speaking, it is difficult to effect good correction of coma. This is because the space defined as having parallel rays is not always coincidence with a space suitable for use in correction of coma, and because the degree of freedom is not sufficient so that it is difficult to obtain the space with parallel rays usuable for aberration correction. Even in this method, it is usual that the performance of the lens for close photography is not always satisfactory as compared with the performance for infinite photography.

SUMMARY OF THE INVENTION

The present invention has for the general object to improve the above mentioned difficult points and to provide a method of compensating deterioration of the image quality of an object at a short distance in a retrofocus type wide angle objective lens.

According to the present invention, the various aberrations and particularly coma of a retrofocus type lens are corrected from deterioration thereof in short distance photography by moving a lens group consisting of a negative lens and a positive lens in the lens system in a divergent light bundle which inevitably exists in the retrofocus type lens, thereby the image quality of an object at a short distance is improved to as a high standard as that of an object at infinity.

In a retrofocus wide angle objective lens of the present invention, therefore, there is provided a lens group having one or more negative lens or lenses and a positive lens arranged in this order from the object side in a divergent light bundle on the object side with respect to a diaphragm thereof to be moved when focusing in response to variation of object distance. In more detail, a retrofocus wide angle objective lens of its aberrations being prevented from deteriorating when making short distance photography is constructed from a lens group N having a negative refractive power and a lens group P, with a diaphragm provided therein, having a positive refractive power. Further, the above mentioned lens group N consists of a front lens group having a negative refractive power and a rear lens group, and the above mentioned rear lens group consists of, from the object side, at least one concave lens and one convex lens, the rear lens group being placed in a divergent light bundle from the front lens group. When the entire lens system is moved outwards in short distance photography, the amount of movement of the above mentioned front lens group and lens group P being moved in unison with each other is different from the amount of movement of the above mentioned rear lens group. Letting $f_R$ be the focal length of the above mentioned rear lens, $f$ the focal length of the entire lens system, and $\omega$ the semi-angle of field, we have $|f_R| > 0.1 \omega f$. By satisfaction of this formula, it is made possible to preserve aberrations almost equivalent to those occurring when photographing an infinitely distant object.

The rear lens group constructed in accordance with the present invention comprises, from the object side, one or more negative lens or lenses and one positive lens, whereby it is preferred that the shape of the negative lens is meniscus, and the positive lens is a convex lens having a strong surface faced toward the object side. The term "strong" means that the radius of curvature is smaller.

Further, the front lens group is a divergent lens group constructed from a concave lens or lenses alone, or a divergent lens group containing at most one convex lens as located at the frontmost position.

And located just before the object side of the rear lens group is always the convex lens of the front lens group.

BRIEF DESCRIPTION OF THE DRAWINGS

FIG. 6A, FIG. 6B and FIG. 6C are various aberration curves of the optical system of FIG. 5 when the object distanct is infinite.

FIG. 8A, FIG. 8B and FIG. 8C are various aberration curves of the optical system of FIG. 5 at a magnification of −0.134 when the rear lens group R is moved with a different amount of movement thereof from that of movement of the front lens group F and lens group P.

DETAILED DESCRIPTION OF PREFERRED EMBODIMENT

Figure 1:
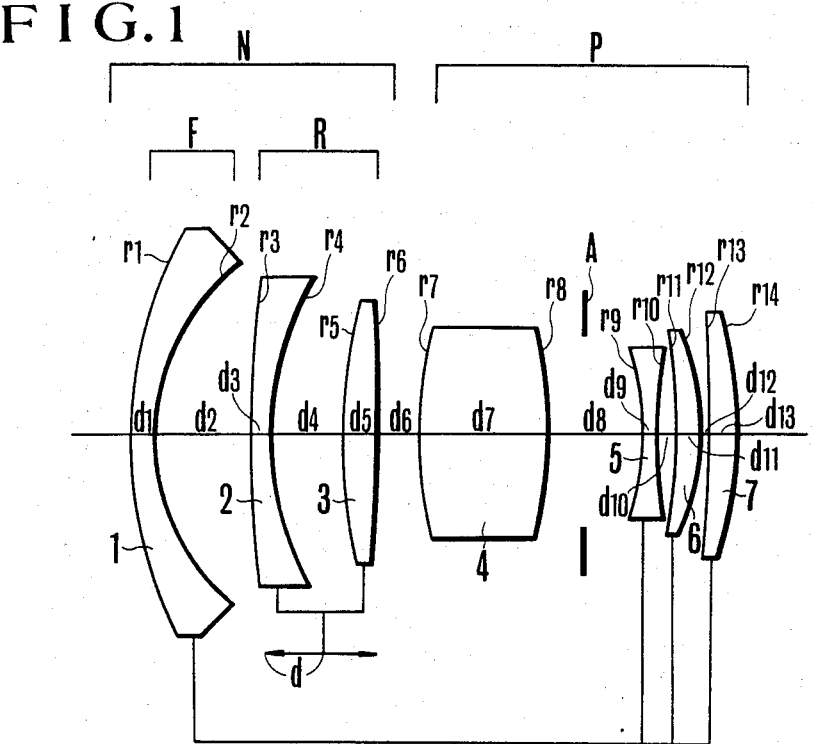
FIG. 1 is a lens block diagram showing a first embodiment of the present invention.

FIG. 1 is a lens block diaphragm showing the first embodiment of the present invention. In FIG. 1, lenses 1, 2 and 3 constitute a negative lens group N, and lenses 4, 5, 6 and 7 constitute a positive lens group P, the lens group N being divided into a front lens group (1) F having a negative refractive power and a rear lens group (2, 3) R. The lens group P and front lens group 1, 4, 5, 6 and 7 are secured in fixed relation with each other. On the other hand, the negative meniscus lens 2 and the positive lens 3 constituting the rear lens group R and positioned in a divergent light bundle emanating from the front lens group F are secured as a unit independently of the other lens groups. A is a diaphragm.

When the lens system is focused to an object at a short distance, it is moved as a whole toward the object, but the amount of movement, $d$, of the lenses (2, 3) is smaller than the amount of movement D of the lenses (1, 4, 5, 6, 7). As a result, the axial separation $d2$ between the lens 1 and the lens 2 is increased with decrease in the object distance, and the axial separation $d6$ between the lens 3 and lens 4 is decreased.

In the following, the reason why the aberration deterioration can be prevented by moving the rear lens group R, with the negative and positive lenses thereof arranged in this order, in the divergent light bundle considerably far away from the diaphragm A will be explained. In order to explain the correction principle, it is assumed that a parallel plane surface plate is inserted into the divergent light bundle in the lens system, and that the lens system is corrected for aberrations together with the parallel plane surface plate inserted therein. In such a lens system, a slight axial movement of the parallel plane surface plate does not cause variation of aberrations. In the case where this parallel plane surface plate is divided into a convex lens and a concave lens, while the combined lens resembling in shape the parallel plane surface plate and an appropriate air space is given between said convex and concave lenses, however, the axial movement of such a plate causes variation of aberrations, because higher order aberrations are apt to occur at a surface having a curvature. In the retrofocus type objective lens, therefore correction of spherical aberration, coma, astigmatism and curvature of field which are the more liable to collapse as the object distance becomes the smaller is made possible by designing the lens system so as to satisfy certain conditions for this portion.

The above-mentioned condition formula $|f_R| > 0.1\omega f$: when $|f_R|$ exceeds this range, aberration correction at short distances can not be effected. In other words, when the absolute value of the focal length of the rear lens group exceeds $0.1\omega f$, certain aberrations which are caused to deteriorate by focusing to a short distance can be well corrected on the one hand, but the other aberrations are produced out of balance to more than correction values on the other hand, so that as a whole it is impossible to preserve the aberration state occurring when the object is at infinity.

For example, when spherical aberration is corrected, the curvature of field and astigmatism are produced. Conversely, when the curvature of field and astigmatism are intended to be corrected, the spherical aberration is largely produced, thus it being made difficult to correct all the aberrations completely.

However, it is convenient from the standpoint of aberration correction at short distances that the value of $|f_R|$ is generally large, because the movement of the lens group is made in the divergent light bundle. However, there are many cases where it is better to positively use the movable lens portion in performing aberration correction for an object at infinity based on the lens configuration of the entire system and the power distribution. In that time, by satisfying the above mentioned condition formula, the character at short distances are also corrected.

As another meaning of the condition formula, when this condition formula is violated, the back focus and F-number vary at short distances. In other words, by satisfying this formula it is made possible to reduce variation of the back focus and F-number and to correct aberrations at short distances.

The reason why $\omega$ is included as a variable in the condition formula is that the larger the angle of field, the severer the correction of image surface is. In order that aberrations at short distances are corrected while maintaining balance of the overall aberrations, it is necessary to increase the lower limit of $|f_R|$.

In such a manner as the above, the performance at short distances can be corrected to as high as the performance an infinity. As a explanation of the effectiveness of this method, mention may be made of the degree of freedom such that there are two variable air spaces in the lens system. Further, based on the fact that the movable portion of the lens system is comprised of a negative lens and a positive lens, it can be pointed out that the coma aberrations are cancelled by the mutual lenses to result in almost no production of coma aberration even at short distances.

This reason will be explained theoretically. Letting II be the aberration coefficient of coma at infinit object position, III the aberration coefficient of astigmatism, and IV the aberration coefficient of sagittal curvature of field according to Matsui's notation, and letting $\delta$ the parameter of movement of the object, the coefficient II$o$ of coma in parameter $\delta$ for the case where the focusing is performed by moving the entire lens system in unison can be expressed as follows:

$$\text{II}o = (1/K^2)[\text{II} - \delta(2\text{III} + \text{IV} + \bar{\alpha}') + (\text{the terms of the higher powers of }\delta)]$$

wherein $K$ is the parameter of object movement; and $\bar{\alpha}'$ is the quantity representing the inclination angle of a pupil-paraxial ray exiting from the rearmost surface.

For $\delta \ll 1$, neglecting the terms of the higher powers of II$o$ and replacing IV by II + P (wherein P is the petzval sum), we have $$IIo = (1/K^2) [II - \delta(3III + P + \bar{\alpha}')]$$

On the other hand, $3III + P + \bar{\alpha}' \neq 0$ generally holds. It is, therefore, to be understood that the value of II varies with object distance.

For example, in the first embodiment shown in FIG. 1, the magnitude of II at the state of object infinity is 0.05, but it is decreased to −0.01 at a magnification of −0.134. For this reason, the balance of aberrations breakes with production of outward coma.

By moving the rear lens group, however, the coefficient of coma is shifted to (+) side, taking 0.01. Therefore, inward coma is produced. Taking into account the amounts of 5th order aberrations, we see that the coma aberration is reduced to zero as a whole.

Further, the rear lens group is constructed by combining a negative lens with a positive lens so that the absolute value of the overall focal length of this portion is longer than the focal length of the entire system, thus the refractive power being weak. Therefore, the deterioration of image quality by the eccentricity (parallel and inclination) of this movable portion is small.

Also the strength against the eccentricity can be said from the fact that the rear lens group is arranged on the object side of the diaphragm and in the divergent light bundle apart from the diaphragm.

In other words, beyond the positive lens group which is usually located on the object side of the diaphragm in the retrofocus type lens is located further on the object side the rear lens group, so that the distance from the center of the diaphragm to the lens is long. Therefore, this distance can be made close to the curvature of lens and therefore the influence due to the eccentricity becomes very dull, so that the image quality can be secured even from the eccentricity.

Further, even when the lens system is incorporated in a lens barrel which is made complicate by the mounting of a diaphragm mechanism linkable with the camera body, there is an advantage that the mechanism design of the lens barrel is easy and the overall size is minimized, because the rear lens group is positioned in the front part of the lens barrel as compared with the diaphragm rear or neighborhood which makes the lens barrel complicate. Also, the rear lens group has a negative lens and positive lens arranged in order so that there is a merit that the inclination of a light bundle entering the negative lens and the inclination of a light bundle exiting from the positive lens can be brought close to each other.

Figure 5:
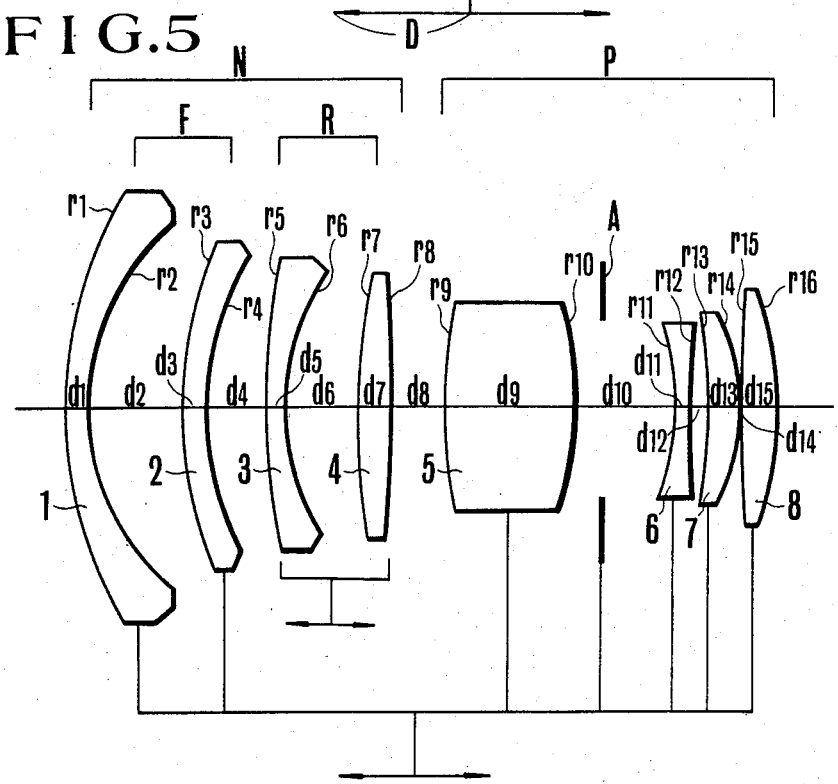
FIG. 5 is a lens block diagram showing a second embodiment of the present invention.
Figure 2A:
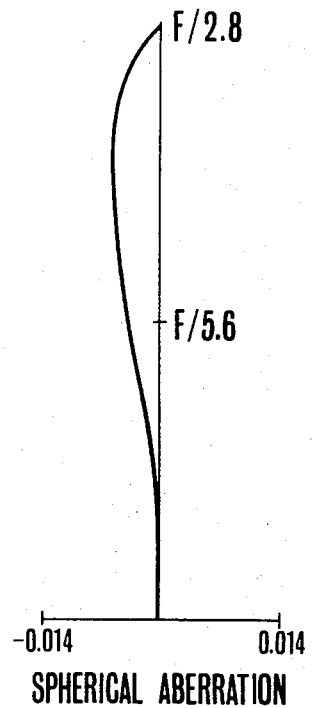
FIG. 2A, FIG. 2B and FIG. 2C are various aberration curves of the optical system of FIG. 1 occurring when the object distance is infinite.
Figure 2B:
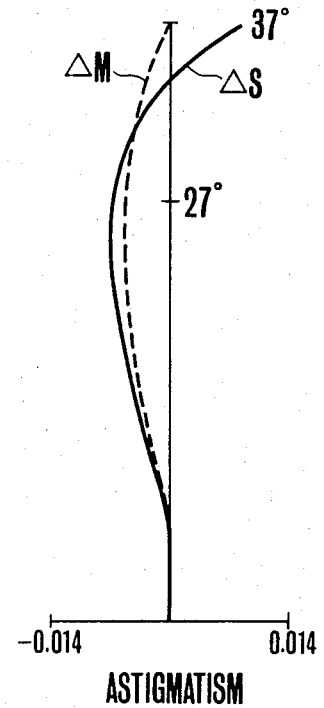
Figure 2C:
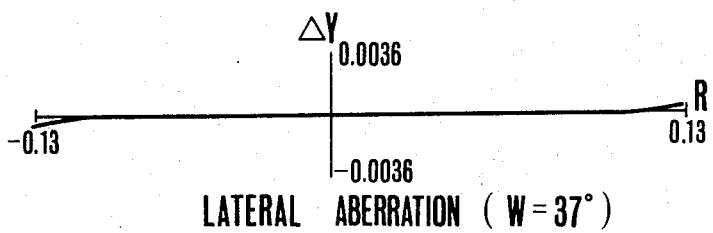
Figures 3A, 3B:
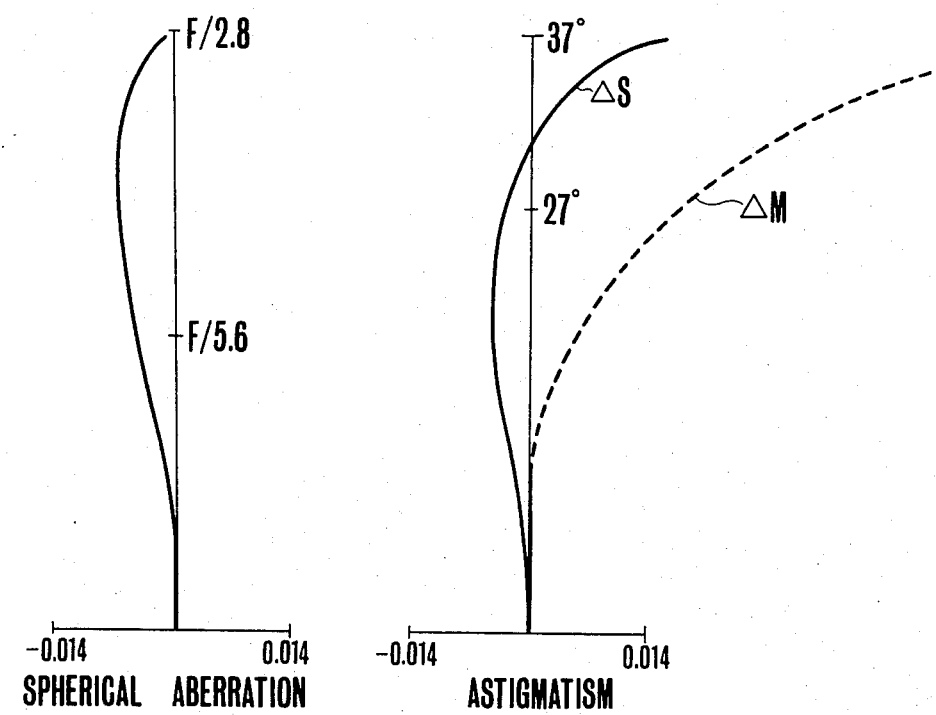
FIG. 3A, FIG. 3B and FIG. 3C are various aberration curves of the optical system of FIG. 1 occurring at a magnification of −0.134 when the rear lens group R is moved in unison with the front lens group F and lens group P.
Figure 3C:
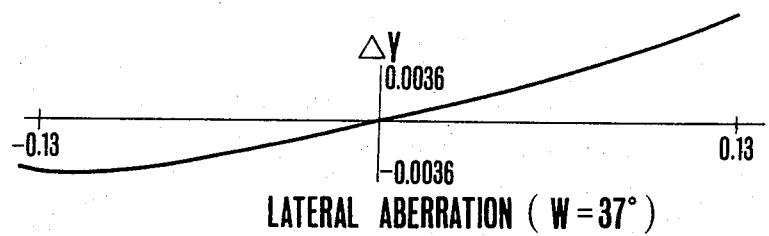
Figures 4A, 4B:
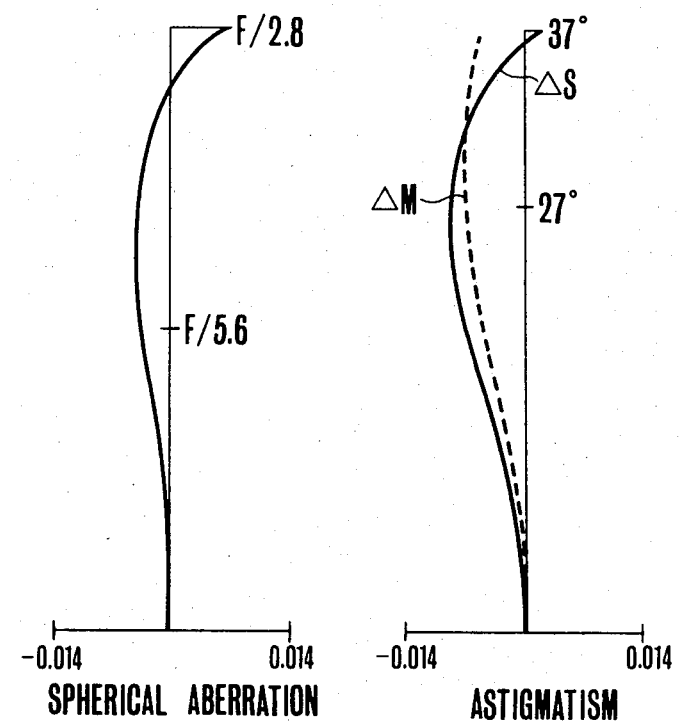
FIG. 4A, FIG. 4B and FIG. 4C are various aberration curves of the optical system of FIG. 1 occurring at a magnification of −0.134 when the rear lens group R is moved with a different amount of movement from that movement of the front lens group F and lens group P.
Figure 4C:
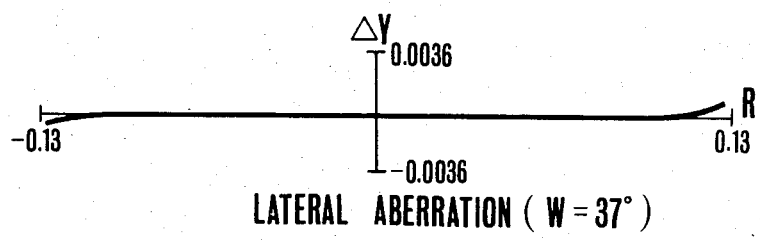
Figure 7A:
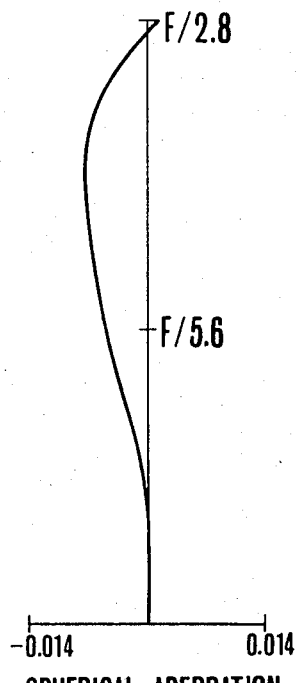
FIG. 7A, FIG. 7B and FIG. 7C are various aberration curves of the optical system of FIG. 5 at a magnification of −0.134 when the rear lens group R is moved in unison with the front lens group F and lens group P.
Figure 7B:
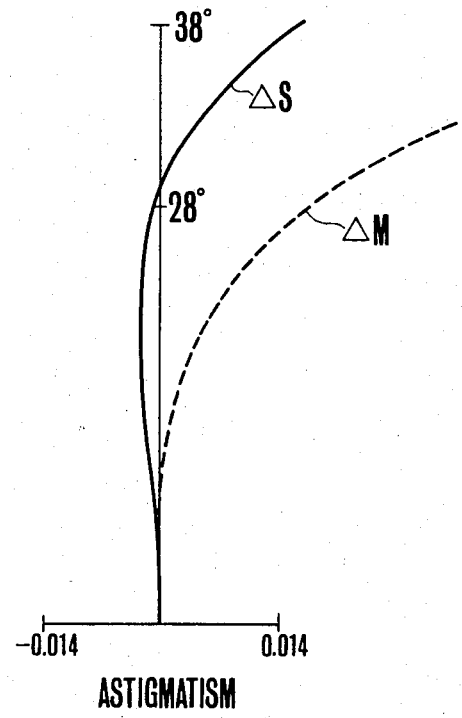
Figure 7C:
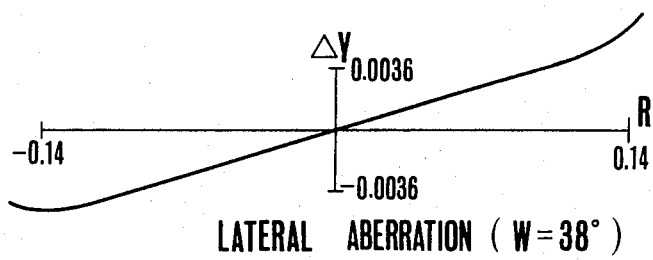
Figure 9:
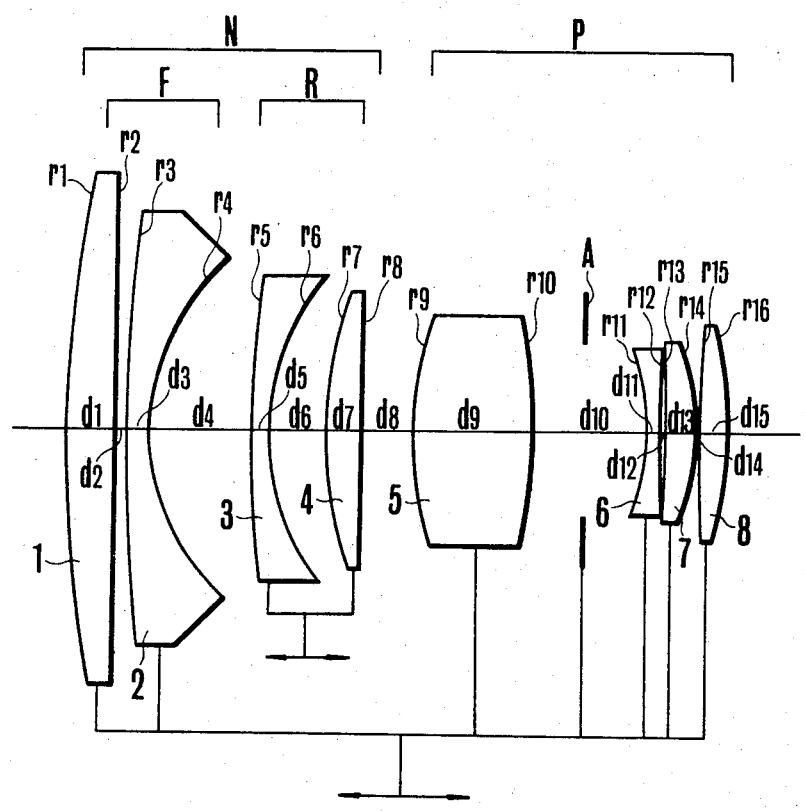
FIG. 9 is a lens block diagram showing a third embodiment of the present invention.
Figures 10A, 10B:
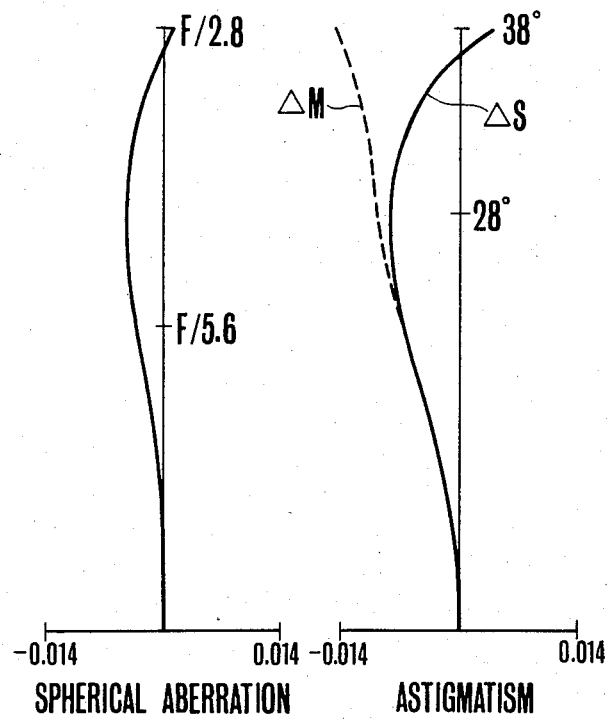
FIG. 10A, FIG. 10B and FIG. 10C are various aberration curves of the optical system of FIG. 9 when the object distance is infinite.
Figure 10C:
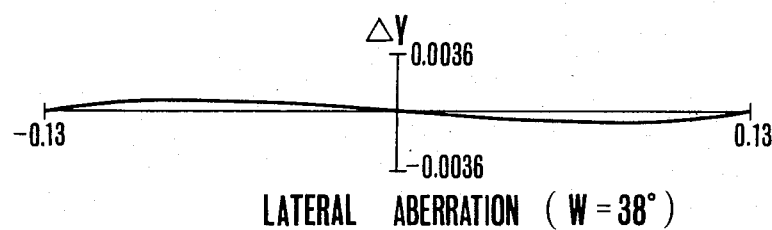
Figures 11A, 11B:
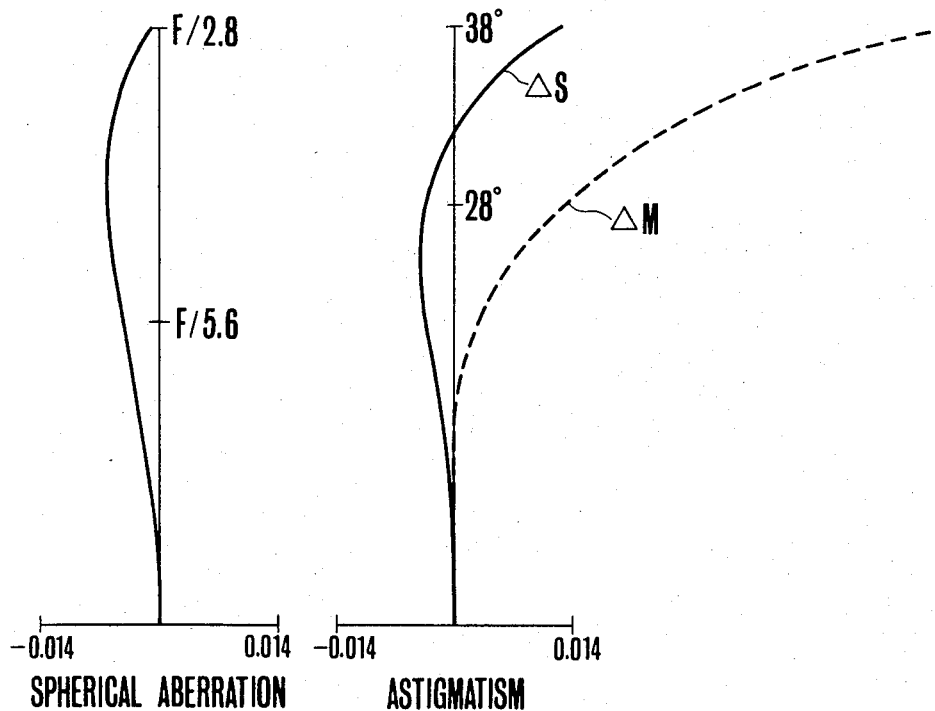
FIG. 11A, FIG. 11B and FIG. 11C are various aberration curves of the optical system of FIG. 9 at a magnification of −0.134 when the rear lens group R is moved in unison with the front lens group F and lens group P.
Figure 11C:
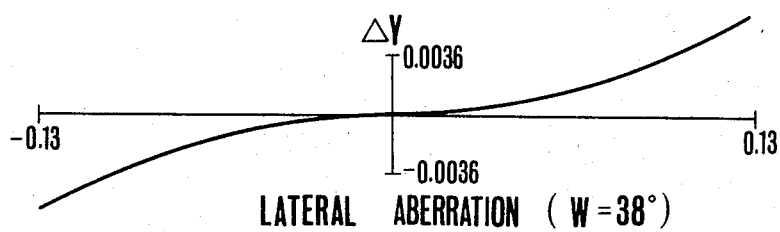
Figures 12A, 12B:
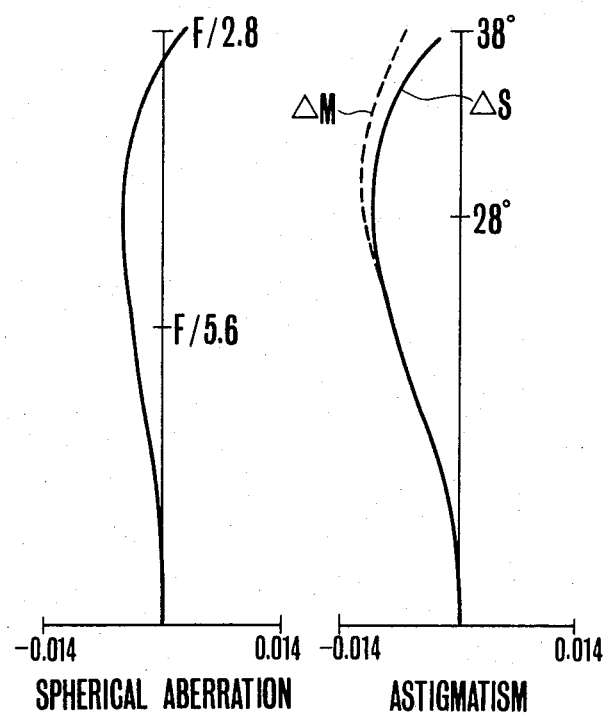
FIG. 12A, FIG. 12B and FIG. 12C are various aberration curves of the optical system of FIG. 9 at a magnification of −0.134 when the rear lens group R is moved with a different amount of movement thereof from that of movement of the front lens group F and lens group P.
Figure 12C:
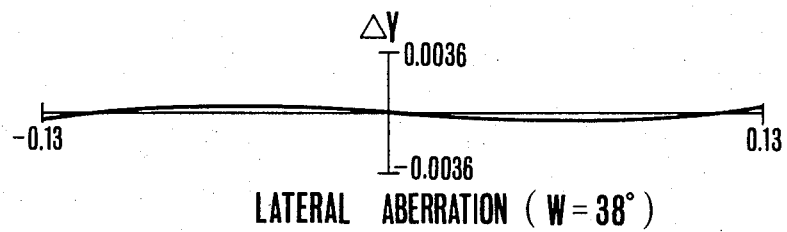

Next, the values of various dimensions of the first embodiment according to FIG. 1, of the second embodiment according to FIG. 1, of the second embodiment according to FIG. 5 and of the third embodiment according to FIG. 9 are given below.

| First embodiment (FIG. 1) f = 1, $F_{NO}$ = 2.8, $\omega$ = 37° | | | |
|---|---|---|---|
| $r_1 =$ 1.3064 | $d_1 = 0.0632$ | $N_1 = 1.61117$ | $V_1 = 55.9$ |
| $r_2 =$ 0.6109 | *$d_2 = 0.3152$ | | |
| $r_3 =$ 3.7622 | $d_3 = 0.0526$ | $N_2 = 1.60729$ | $V_2 = 49.3$ |
| $r_4 =$ 0.7757 | $d_4 = 0.2100$ | | |
| $r_5 =$ 1.7619 | $d_5 = 0.1053$ | $N_3 = 1.72342$ | $V_3 = 38.0$ |
| $r_6 =$ −9.1853 | *$d_6 = 0.1500$ | | |
| $r_7 =$ 1.0840 | $d_7 = 0.3627$ | $N_4 = 1.60311$ | $V_4 = 60.7$ |
| $r_8 =$ −1.3336 | $d_8 = 0.2910$ | | |
| $r_9 =$ −0.6365 | $d_9 = 0.0351$ | $N_5 = 1.74077$ | $V_5 = 27.8$ |
| $r_{10} =$ 1.8877 | $d_{10} = 0.0491$ | | |
| $r_{11} =$ −2.5630 | $d_{11} = 0.0947$ | $N_6 = 1.69350$ | $V_6 = 53.3$ |
| $r_{12} =$ −0.6112 | $d_{12} = 0.0070$ | | |
| $r_{13} =$ −26.8270 | $d_{13} = 0.0912$ | $N_7 = 1.69350$ | $V_7 = 53.3$ |
| $r_{14} =$ −1.1736 | | | |

*is a variable space

The length from the first surface to the rearmost surface = 1.8271
 Back focus = 1.2807
 $|f_R| = 15.06$
 At a magnification of −0.134 :
  $d_2 = 0.3854$
  $d_6 = 0.0798$ wherein $ri$ is the radii of curvature of lenses, $di$ is the thicknesses of lenses or separations between the surfaces; $Ni$ is the indicies of refraction; and $Vi$ is the Abbe's number.

| Second embodiment (FIG. 5) f = 1, $F_{NO}$ = 2.8, $\omega$ = 37° | | | |
|---|---|---|---|
| $r_1 =$ 1.23155 | $d_1 = 0.06316$ | $N_1 = 1.61117$ | $V_1 = 55.9$ |
| $r_2 =$ 0.70388 | $d_2 = 0.28121$ | | |
| $r_3 =$ 1.50662 | $d_3 = 0.05263$ | $N_2 = 1.61117$ | $V_2 = 55.9$ |
| $r_4 =$ 0.92380 | *$d_4 = 0.20631$ | | |
| $r_5 =$ 2.98847 | $d_5 = 0.05263$ | $N_3 = 1.60729$ | $V_3 = 49.3$ |
| $r_6 =$ 0.81910 | $d_6 = 0.19952$ | | |
| $r_7 =$ 1.65922 | $d_7 = 0.10526$ | $N_4 = 1.72342$ | $V_4 = 38.0$ |
| $r_8 =$ −10.16219 | *$d_8 = 1.12219$ | | |
| $r_9 =$ 1.08565 | $d_9 = 0.38597$ | $N_5 = 1.60311$ | $V_5 + 60.7$ |
| $r_{10} =$ −1.46681 | $d_{10} = 0.29961$ | | |
| $r_{11} =$ −0.63435 | $d_{11} = 0.03509$ | $N_6 = 1.74077$ | $V_6 = 27.8$ |
| $r_{12} =$ 2.01901 | $d_{12} = 0.04912$ | | |
| $r_{13} =$ −2.67331 | $d_{13} = 0.09474$ | $N_7 = 1.69350$ | $V_7 = 53.3$ |
| $r_{14} =$ −0.59919 | $d_{14} = 0.00702$ | | |
| $r_{15} =$ 85.43513 | $d_{15} = 0.09123$ | $N_8 = 1.69350$ | $V_8 = 53.3$ |
| $r_{16} =$ −1.33708 | | | |

*is a variable space

The length from the first surface to the rearmost surface = 2.0457
 Back focus = 1.3133
 $|f_R| = 40.4$
 At a magnification of −0.134:
  $d_4 = 0.24120$
  $d_8 = 0.08710$ In the second embodiment, only lens 3 and lens 4 are movable independently of the other lenses.

| Third embodiment (FIG. 9) f = 1, $F_{NO}$ = 2.8, $\omega$ = 38° | | | |
|---|---|---|---|
| $r_1 =$ 3.8596 | $d_1 = 0.14035$ | $N_1 = 1.60311$ | $V_1 = 60.7$ |
| $r_2 =$ ∞ | $d_2 = 0.03494$ | | |
| $r_3 =$ 7.5094 | $d_3 = 0.06316$ | $N_2 = 1.60729$ | $V_2 = 49.3$ |
| $r_4 =$ 0.6628 | *$d_4 = 0.30565$ | | |
| $r_5 =$ 4.0216 | $d_5 = 0.05263$ | $N_3 = 1.60729$ | $V_3 = 49.3$ |
| $r_6 =$ 0.7421 | $d_6 = 0.16742$ | | |
| $r_7 =$ 1.2428 | $d_7 = 0.10526$ | $N_4 = 1.72342$ | $V_4 = 38.0$ |
| $r_8 =$ −30.6430 | *$d_8 = 0.15683$ | | |
| $r_9 =$ 1.0579 | $d_9 = 0.36140$ | $N_5 = 1.60311$ | $V_5 = 60.7$ |
| $r_{10} =$ −1.5508 | $d_{10} = 0.33634$ | | |
| $r_{11} =$ −0.6291 | $d_{11} = 0.03509$ | $N_6 = 1.74077$ | $V_6 = 27.8$ |
| $r_{12} =$ 1.9835 | $d_{12} = 0.01856$ | | |
| $r_{13} =$ −2.8834 | $d_{13} = 0.09474$ | $N_7 = 1.69350$ | $V_7 = 53.3$ |
| $r_{14} =$ −0.6405 | $d_{14} = 0.00702$ | | |
| $r_{15} =$ 25.9050 | $d_{15} = 0.09123$ | $N_8 = 1.69350$ | $V_8 = 53.3$ |
| $r_{16} =$ −1.0729 | | | |

*is a variable space

The length from the first surface to the rearmost surface = 1.9706
 Back focus = 1.2807
 $|f_R| = 150.49$
 At a magnification of −0.134:
  $d_4 = 0.36881$
  $d_8 = 0.09368$ In the third embodiment, lens 3 and lens 4 are movable independently of the other lenses.

What is claimed is:

1. A retro-focus wide-angle objective lens corrected for short distance photography, comprising:

a first lens group N at the object end and having a negative refractive power, a second lens group P closer to the image end and having a positive refractive power, said first lens group N including a front lens group having a negative refractive power and a rear lens group, said front lens group producing a divergent light bundle, said rear lens group being located in the divergent light bundle from the front lens group, said rear lens group having a negative lens toward the object and a first positive lens, said second lens group P including a front positive lens facing said first positive lens of said rear lens group and a diaphragm disposed toward the image end of said front positive lens, said first and second lens groups N and P being movable toward the object for short distance photography, said front lens group and said second lens group P being movable in unison with each other at a rate different from the rate of said rear lens group.

2. A lens as in claim 1, wherein said front lens group of said first lens group N includes a negative lens adjacent said rear lens group.

3. A lens as in claim 2, wherein said rear lens group includes a negative meniscus lens concave to the image, said rear lens group having a biconvex lens with one surface more convex than a second surface, said one surface being directed toward the object end.

4. A lens as in claim 2, wherein said front lens group consists of a single negative meniscus lens concave to the image.

5. A lens as in claim 2, wherein said front lens group consists of two negative meniscus lenses concave to the image.

6. A retrofocus wide-angle objective lens corrected for short distance photography, comprising a pair of adjoining negative lenses with a first variable air space therebetween, a pair of adjoining positive lenses with a second variable air space therebetween, said negative lenses being disposed toward an object end and said positive lenses toward an image end of the objective lens, said lens toward the image end of said second variable air space forming at least a portion of a positive lens group having a positive refractive power, said lens toward the object end of said first variable air space forming at least a portion of a front lens group having a negative refractive power and said lenses between the variable air spaces forming a rear lens group, a diaphragm in said positive lens group disposed toward the image end of said positive lens facing the second variable air space, all of said lenses being movable toward the object for short distance photography, the rate of movement of said front lens group and said positive lens group being equal and in unison and being different from the rate of movement of said rear lens group.

7. A lens as in claim 6, wherein said first variable air space is larger and said second variable air space is smaller during photography of an object at an infinite distance as compared with the air spaces during close-up photography.

8. A retrofocus wide-angle objective lens corrected for short distance photography, comprising:

a first lens group and a second lens group and a third lens group in order from an object end to an image end, said first lens group having a divergent power, said second lens group including a negative group having at least one negative meniscus lens concave to the image, and one positive lens closer to the image end than the negative group, said third lens group having convergent power and having a positive lens toward the object end, a diaphragm incorporated into said third lens group closer to the image end than said front positive lens, means for moving the first and third lens groups and maintaining a constant space therebetween, means for moving the second lens group at a rate different from that of said first lens group during short distance photography.

9. A lens as in claim 8, wherein said first lens group has a negative lens adjacent to said second lens group.

10. A lens as in claim 9, wherein said one positive lens of said second lens group is a double convex lens having two convex surfaces, one convex surface being more convex than the other of the convex surfaces and facing the object end.

11. A lens as in claim 8, wherein said first lens group consists of a single negative meniscus lens concave to the image.

12. A lens as in claim 8, wherein said first lens group consists of two negative meniscus lenses concave to the image.

* * * * *